United States Patent
Bickham et al.

(10) Patent No.: US 8,958,675 B2
(45) Date of Patent: Feb. 17, 2015

(54) MULTIMODE OPTICAL FIBER SYSTEMS WITH ADJUSTABLE CHROMATIC MODAL DISPERSION COMPENSATION

(71) Applicant: Corning Incorporated, Corning, NY (US)

(72) Inventors: Scott Robertson Bickham, Corning, NY (US); Xin Chen, Corning, NY (US); Ming-Jun Li, Horseheads, NY (US); Dale Robert Powers, Campbell, NY (US); Richard Stephen Vodhanel, Red Bank, NJ (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/833,769

(22) Filed: Mar. 15, 2013

(65) Prior Publication Data

US 2014/0086578 A1 Mar. 27, 2014

Related U.S. Application Data

(63) Continuation-in-part of application No. 13/624,248, filed on Sep. 21, 2012.

(60) Provisional application No. 61/670,865, filed on Jul. 12, 2012.

(51) Int. Cl.
*G02B 6/02* (2006.01)
*H04B 10/2513* (2013.01)
(Continued)

(52) U.S. Cl.
CPC ........ *H04B 10/2513* (2013.01); *G02B 6/02261* (2013.01); *G02B 6/0288* (2013.01); *H04B 10/2507* (2013.01); *H04B 10/2581* (2013.01);
(Continued)

(58) Field of Classification Search
CPC ...................................................... G02B 6/268
USPC ................................................. 385/123, 124
See application file for complete search history.

(56) References Cited

U.S. PATENT DOCUMENTS 6,317,549 B1 * 11/2001 Brown .......................... 385/123
6,363,195 B1    3/2002 Abbott ......................... 385/123
(Continued)

OTHER PUBLICATIONS

Jeunhomme, "Single Mode Fiber Optics," New York Marcel Dekker, 1990, pp. 39-44.
(Continued)

*Primary Examiner* — Ryan Lepisto
(74) *Attorney, Agent, or Firm* — Robert L Carlson

(57) ABSTRACT

Multimode optical fiber systems with adjustable chromatic modal dispersion compensation are disclosed, wherein the system includes a VCSEL light source and primary and secondary optically coupled multimode optical fibers. Because the VCSEL light source has a wavelength spectrum that radially varies, its use with the primary multimode optical fiber creates chromatic modal dispersion that reduces bandwidth. The compensating multimode optical fiber is designed to have a difference in alpha parameter relative to the primary multimode optical fiber of $-0.1 \leq \Delta\alpha \leq -0.9$. This serves to create a modal delay opposite to the chromatic modal dispersion. The compensation is achieved by using a select length of the compensating multimode optical fiber optically coupled to an output end of the primary multimode optical fiber. The compensating multimode optical fiber can be configured to be bend insensitive.

24 Claims, 11 Drawing Sheets

(51) Int. Cl.
*G02B 6/028* (2006.01)
*H04B 10/2507* (2013.01)
*H04B 10/2581* (2013.01)
*G02B 6/26* (2006.01)
*H04B 10/079* (2013.01)
*G02B 6/036* (2006.01)

(52) U.S. Cl.
CPC .......... *G02B 6/268* (2013.01); *H04B 10/07951* (2013.01); *G02B 6/03627* (2013.01)
USPC ........................................ 385/123; 385/124

(56) References Cited

U.S. PATENT DOCUMENTS

| | | | |
|---|---|---|---|
| 7,995,888 B2 | 8/2011 | Gholami et al. | |
| 2006/0034573 A1* | 2/2006 | Guan et al. | 385/123 |
| 2010/0310218 A1 | 12/2010 | Molin | 385/123 |
| 2011/0054862 A1 | 3/2011 | Pimpinella | |
| 2011/0293290 A1 | 12/2011 | Gholami | 398/192 |

OTHER PUBLICATIONS

Pimpinella, "Investigation of Bandwidth Dependence on Chromatic and Modal Dispersion in MMF Links Using VCSELs," OFC/NFOEC Technical Digest, Jan. 2012.

Gholami, "Compensation of Chromatic Dispersion by Modal Dispersion in MMF and VCSEL-Based Gigabit Ethernet Transmissions," IEEE Photonics Technology Letters, vol. 21, No. 10, May 15, 2009.

Guan, "Multimode Fibers For Compensating Intermodal Dispersion of Graded-Index Multimode Fibers," Journal of Lightwave Technology, vol. 22, No. 7, Jul. 2004.

Molin, "Chromatic Dispersion Compensated Multimode Fibers for Data Communications," ECOC Technical Digest, 2011.

* cited by examiner

MULTIMODE OPTICAL FIBER SYSTEMS WITH ADJUSTABLE CHROMATIC MODAL DISPERSION COMPENSATION

CROSS-REFERENCE TO RELATED APPLICATIONS

This application is a continuation-in-part of U.S. patent application Ser. No. 13/624,248 filed on Sep. 21, 2012, which claims the benefit of priority under 35 U.S.C. §119 of U.S. Provisional Application Ser. No. 61/670,865 filed on Jul. 12, 2012, the contents of which are relied upon and incorporated herein by reference in their entirety.

FIELD

The present specification relates generally to optical fibers and more specifically to multimode optical fiber systems that provide for adjustable chromatic modal dispersion compensation.

All references cited herein are incorporated by reference in their entirety herein.

BACKGROUND

Optical fibers are currently used to transmit optical signals. Optical fibers, including multimode optical fibers, are frequently used for data transmission or high-speed data transmission over distances ranging from a meter or less up to the distance needed to transmit throughout a building or between buildings near one another that are optical signals associated with local networks.

Multimode fibers, by definition, are designed to support multiple guided modes at a given wavelength. The bandwidth of a multimode fiber is defined by the fiber's ability to carry the different optical (guided) modes with little or no temporal separation as they travel down the fiber. This requires that the group velocities of the different optical modes be as close to the same value as possible. That is to say, there should be minimal intermodal dispersion (i.e., the difference in the group velocity between the different guided modes should be minimized) at the design ("peak") wavelength $\lambda_P$.

A multimode optical fiber can be designed to minimize the amount of intermodal dispersion and differential delays between mode groups. This is done by providing the core of the multimode fiber with a gradient-refractive-index profile whose shape is generally parabolic. The gradient-index profile is optimized for reducing intermodal dispersion when the additional distance traveled by higher-order modes is compensated for by those modes seeing a lower refractive index than lower-order modes that have to travel a shorter distance, the result being that all modes travel substantially the same overall optical path. Here, optical path means the physical distance traveled multiplied by the index of refraction of the material through which the light travels.

This minimization of intramodal dispersion becomes complicated when the light source used to send light down the multimode fiber is not strictly monochromatic. For example, a vertical-cavity, surface-emitting laser (VCSEL) has a wide-spectrum discrete emission. The VCSELs used for high-speed data transmission applications are generally longitudinally, but not transversally, single mode. As it turns out, each transverse mode of a VCSEL has its own wavelength corresponding to the various peaks of the emission spectrum, with the shorter wavelengths corresponding to the higher-order modes. Accordingly, a multimode fiber that is optimized to have a maximum bandwidth for a given wavelength will not exhibit optimum bandwidth performance when the light source causes the different modes to have different wavelengths.

Variations in the intramodal dispersion can also occur when the peak wavelength $\lambda P$ of the multimode fiber does not coincide with the operating wavelength, $\lambda O$. For example, small errors in the curvature (alpha) of the core can result in $\lambda P$ values that are lower or higher than the target value, and this results in lower bandwidth due to variations in the optical path lengths for the different propagating mode groups. This situation can also arise when signals at more than one wavelength propagate in the multimode fiber, for example with coarse wavelength division multiplexing (CWDM). Signals propagating at lower or higher wavelengths than $\lambda P$ will incur larger differential delays than desirable, thereby decreasing the bandwidth and degrading the system performance.

One solution to the problem is to form the multimode fiber with a refractive-index profile that provides an optimized bandwidth for a light source having a particular transverse polychromatic mode spectrum rather than a single wavelength. Such an approach is described in U.S. Pat. No. 7,995,888 (hereinafter, the '888 patent). This approach makes sense under the assumption that light sources such as VCSELs all have generally identical wavelength spectra. However, the polychromatic mode spectra for VCSELs can differ substantially between the same types of VCSELs, as well as between different types of VCSELs. This means that a different optimized multimode optical fiber would have to be designed to match each of the different possible polychromatic mode spectra for VCSELs used in telecommunications applications. This approach is inefficient, and from a commercial telecommunications viewpoint is impractical and expensive to implement.

SUMMARY

An aspect of the disclosure is a multimode optical fiber system for use with a VCSEL light source having transverse modes of different wavelengths. The system includes a primary multimode optical fiber having a length L1 and having a first relative refractive index profile with a first alpha value $\alpha_{40}$ generally configured to provide for a minimum amount of intermodal dispersion of guided modes at a peak wavelength $\lambda_{P40}$, wherein the different wavelengths of the transverse modes create chromatic modal dispersion. The system also includes a compensating multimode optical fiber having a length L2<L1 and that is optically coupled to the primary multimode optical fiber. The compensating multimode optical fiber has a second relative refractive index profile with a second alpha value $\alpha_{60}$, wherein $0.1 \leq |\alpha 60 - \alpha 40| \leq 0.9$. In a related aspect of this disclosure, the compensating multimode optical fiber has a second relative refractive index profile with a second alpha value $\alpha 60$, wherein $-0.1 \geq (\alpha 60 - \alpha 40) \geq -0.9$.

Another aspect of the disclosure is a method of compensating a primary multimode optical fiber having a chromatic dispersion D, an alpha parameter $\alpha_{40}$ and a length L1 for chromatic modal dispersion that arises from using the primary multimode optical fiber with a VCSEL light source having transverse modes of different wavelengths. The method includes measuring a center-wavelength difference $\Delta\lambda_{max-c}$ for the VCSEL light source. The method also includes calculating a maximum delay difference $\Delta t$ due to chromatic modal dispersion in the primary multimode optical fiber based on $\Delta\lambda_{max-c}$, the chromatic dispersion D and the length L1. The method also includes determining a maximum relative delay $\Delta\tau_{max}$ imparted by a compensating multimode optical fiber having an alpha value $\alpha_{60}$ and a maximum relative refractive index $\Delta_0$. The method additionally includes determining a length L2 of the compensating multimode optical fiber based on the maximum delay difference $\Delta t$ and the maximum relative delay $\Delta \tau_{max}$.

Another aspect of the disclosure is a multimode optical fiber system having a bandwidth. The system includes a VCSEL light source that emits light in transverse modes having different wavelengths. The system also includes a primary multimode optical fiber optically coupled to the VCSEL light source and having a length L1 and a first relative refractive index profile that includes a first alpha value $\alpha_{40}$ that gives rise to chromatic modal dispersion when the VCSEL light travels therethrough. The system further includes a compensating multimode optical fiber optically coupled to the primary multimode optical fiber. The compensating multimode optical fiber has a length L2<L1. The length L2 is selected to at least partially compensate for the chromatic modal dispersion by introducing an opposite modal delay defined by an alpha value $\alpha 60$, wherein $0.1 \leq |\alpha 60 - \alpha 40| \leq 0.9$. In a related aspect of this disclosure, the compensating multimode optical fiber has a second relative refractive index profile with a second alpha value $\alpha 60$, wherein $-0.1 \geq (\alpha 60 - \alpha 40) \geq -0.9$.

Additional features and advantages are to be set forth in the detailed description that follows, and in part will be readily apparent to those skilled in the art from that description or recognized by practicing the embodiments as described herein, including the detailed description that follows, the claims and the appended drawings.

It is to be understood that both the foregoing general description and the following detailed description are merely exemplary, and are intended to provide an overview or framework for understanding the nature and character of the claims. The accompanying drawings are included to provide a further understanding, and are incorporated into and constitute a part of this specification. The drawings illustrate one or more embodiment(s), and together with the description serve to explain the principles and operation of the various embodiments.

The claims as set forth below are incorporated into and constitute part of the Detailed Description as set forth below.

DETAILED DESCRIPTION

Figure 1:
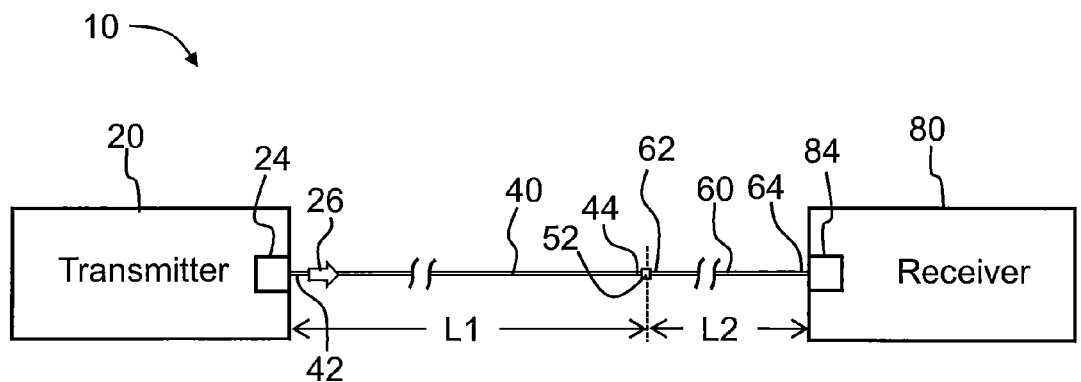
FIG. 1 is a schematic diagram of an example multimode optical fiber system according to the disclosure, wherein the system has a primary multimode optical fiber optically connected at one end to a light source and at its opposite end to a compensating multimode optical fiber.

The symbol μm and the word "micron" are used interchangeably herein.

The term "relative refractive index," as used herein, is defined as:

$$\Delta(r) = [n(r)^2 - n_{REF}^2]/2n(r)^2,$$

where n(r) is the refractive index at radius r, unless otherwise specified. The relative refractive index is defined at the fiber's peak wavelength $\lambda_P$. In one aspect, the reference index $n_{REF}$ is silica glass. In another aspect, $n_{REF}$ is the maximum refractive index of the cladding. As used herein, the relative refractive index is represented by $\Delta$ and its values are given in units of "%," unless otherwise specified. In cases where the refractive index of a region is less than the reference index $n_{REF}$, the relative refractive index is negative and is referred to as having a depressed region or depressed index, and the minimum relative refractive index is calculated at the point at which the relative index is most negative, unless otherwise specified. In cases where the refractive index of a region is greater than the reference index $n_{REF}$, the relative refractive index is positive and the region can be said to be raised or to have a positive index.

The parameter a (also called the "profile parameter" or "alpha parameter") as used herein relates to the relative refractive index $\Delta$, which is in units of "%," where r is the radius (radial coordinate), and which is defined by:

$$\Delta(r) = \Delta_0 \left[ 1 - \left( \frac{r - r_m}{r_0 - r_m} \right)^\alpha \right],$$

where $r_m$ is the point where $\Delta(r)$ is the maximum $\Delta_0$ (also referred to in certain cases below as $\Delta_{1MAX}$), $r_0$ is the point at which $\Delta(r)$ % is zero and r is in the range $r_i \leq r \leq r_f$, where $\Delta(r)$ is defined above, $r_i$ is the initial point of the α-profile, $r_f$ is the final point of the α-profile and α is an exponent that is a real number. For a step index profile, $\alpha > 10$, and for a gradient-index profile, $\alpha < 5$. It is noted here that different forms for the core radius $r_0$ and maximum relative refractive index $\Delta_0$ can be used without affecting the fundamental definition of Δ. The maximum relative refractive index $\Delta_0$ is also called the "core delta," and these terms are used interchangeably herein. For a practical fiber, even when the target profile is an alpha profile, some level of deviation from the ideal situation can occur. Therefore, the alpha value for a practical fiber is the best-fit alpha from the measured index profile.

The limits on any ranges cited herein are considered to be inclusive and thus to lie within the range, unless otherwise specified.

The NA of an optical fiber means the numerical aperture as measured using the method set forth in IEC-60793-1-43 (TIA SP3-2839-URV2 FOTP-177) titled "Measurement Methods and Test Procedures: Numerical Aperture".

The term "dopant" as used herein refers to a substance that changes the relative refractive index of glass relative to pure undoped $SiO_2$. One or more other substances that are not dopants may be present in a region of an optical fiber (e.g., the core) having a positive relative refractive index Δ.

The term "mode" is short for a guided mode or optical mode. A multimode optical fiber means an optical fiber designed to support the fundamental guided mode and at least one higher-order guided mode over a substantial length of the optical fiber, such as 2 meters or longer.

The cutoff wavelength $\lambda_C$ of a mode is the minimum wavelength beyond which a mode ceases to propagate in the optical fiber. The cutoff wavelength of a single-mode fiber is the minimum wavelength at which an optical fiber will support only one propagating mode, i.e., below the cutoff wavelength, two or more modes can propagate. Typically the highest cutoff wavelength $\lambda_C$ of a multimode optical fiber corresponds to the cutoff wavelength of the $LP_{11}$ mode. A mathematical definition can be found in Jeunhomme's *Single Mode Fiber Optics* (New York: Marcel Dekker, 1990; pp. 39-44), wherein the theoretical fiber cutoff is described as the wavelength at which the mode propagation constant becomes equal to the plane wave propagation constant in the outer cladding. A measured cutoff wavelength $\lambda_C$ is normally lower than the theoretical cutoff wavelength, typically 20 nm to 50 nm lower for a 2 meter fiber with substantially straight deployment.

The operating wavelength λO is the wavelength at the particular system operates, with λO=850 nm being an example of an operating wavelength used in multimode telecommunications systems that utilize VCSELs as the light source, and that may be used herein. In systems where CWDM is employed there may be more than one operating wavelength, for example λO1, λO2, λO3, and λO4. The "peak" wavelength $\lambda_P$ is the wavelength at which a particular optical fiber has the highest bandwidth. The operating wavelength is the wavelength at which the fiber is operating and is not necessarily the peak wavelength. For example a multimode fiber can have a peak wavelength λP=850 nm but the light traveling therein can have an operating wavelength of 852 nm.

In systems transmitting at a single wavelength, the optimum value of λP may be equal to the operating wavelength, for example, λP=λO=850 nm or λP=λO=1310 nm. In systems transmitting at more than one wavelength, the optimum value of λP may be located near the center of the range of operating wavelengths, for example λO1<λO2<λP<λO3<λO1, where for example 800 nm<λP<900 nm<λP<1100 nm, 1200 nm<λP<1400 nm or 1500 nm<λP<1600 nm. The peak wavelengths of primary and compensating optical fibers 40 and 60 are denoted as $\lambda_{40}$ and $\lambda_{60}$, respectively, where appropriate.

The wavelength $\lambda_{01}$ is the wavelength of the $LP_{01}$ mode as generated by a VCSEL light source and is generally the longest (highest) wavelength of a VCSEL wavelength spectrum. In certain cases below, the wavelength $\lambda_{01}$ is the same as the peak wavelength $\lambda_P$.

The VCSEL wavelength bandwidth $\Delta\lambda_{max}$ is a measure of the wavelength difference between the lowest-order and highest-order transverse modes.

The center operating wavelength $\lambda_{CW}$ is used in connection with a VCSEL light source and is the center wavelength of the particular VCSEL spectrum. It is noted that as the VCSEL spectrum typically varies as a function of radius, the center operating wavelength also varies as a function of the VCSEL radius. The difference in the center operating wavelengths for different VCSEL spectra associated with different radial positions is defined by the maximum center-wavelength difference $\Delta\lambda_{max-c}$ and can be measured using the fiber-offset method as described below in connection with measurement system 100 of FIG. 5.

The overfill bandwidth (BW) of an optical fiber is defined herein as using overfilled launch conditions at 850 nm according to IEC 60793-1-41 (TIA-FOTP-204), Measurement Methods and Test Procedures: Bandwidth. The minimum calculated effective modal bandwidths can be obtained from measured differential mode delay spectra as specified by IEC 60793-1-49 (TIA/EIA-455-220), Measurement Methods and Test Procedures: Differential Mode Delay. The units of bandwidth for an optical fiber can be expressed in MHz·km, GHz·km, etc., and bandwidth expressed in these kinds of units is also referred to in the art as the bandwidth-distance product. The bandwidth here is also called modal bandwidth, which is defined in part by modal dispersion. At the system level, the overall bandwidth can be limited by chromatic dispersion, which limits the system performance at a high bit rate.

The term "modal dispersion" or "intermodal dispersion" is, in an optical fiber, a measure of the difference in the travel times of the different modes of an optical fiber for light of a single wavelength and is primarily a function of the alpha profile of the optical fiber.

The term "modal delay" is used to denote for laser pulses the time delay of the different modes due to modal dispersion and refers to the greatest delay between the different modes, unless stated otherwise.

The term "material chromatic dispersion" or "material dispersion" is a measure of how strongly a material causes light of different wavelengths to travel at different speeds within the material, and as used herein is measured in units of ps/ (nm·km).

The term "chromatic modal dispersion" is related to both material chromatic dispersion and modal dispersion and is a measure of the difference in the travel times of different modes of an optical fiber when these modes have different wavelengths. In multimode fibers, the chromatic dispersion for each mode is approximately the same as the material dispersion.

The term "compensation," as used in connection with the modal delay of the compensating multimode optical fiber that compensates the chromatic modal dispersion of the primary multimode optical fiber, means either partial or complete compensation, i.e., a reduction or elimination of the adverse effects of the chromatic modal dispersion on performance such as bandwidth.

Multimode Optical Fiber System

Figure 2:
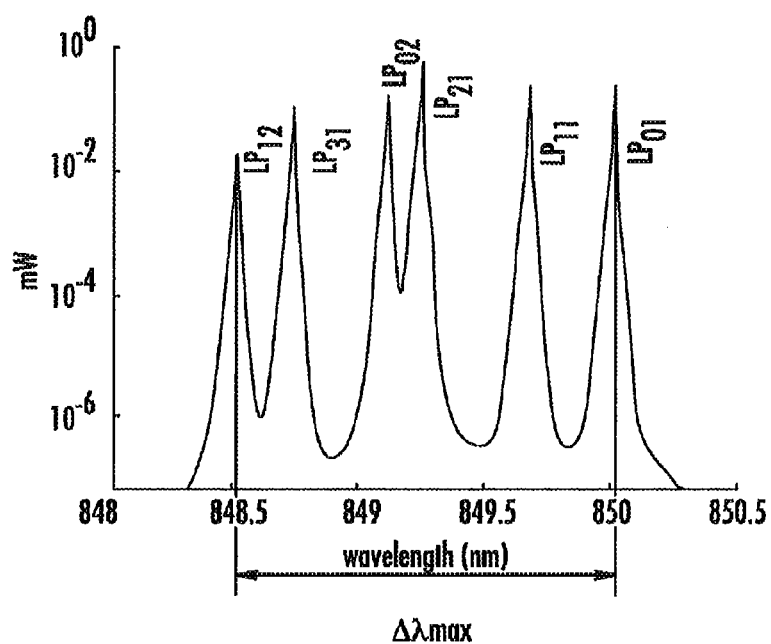
FIG. 2 is an example wavelength spectrum of a VCSEL showing how the different transverse modes have different wavelengths.

FIG. 1 is a schematic diagram of an example multimode optical fiber system ("system") 10 that includes an optical transmitter 20, first and second multimode optical fibers 40 and 60, and a receiver 80. The optical transmitter 20 has a light source 24. In an example, light source 24 is a VCSEL that generates an output 26 at a number of transverse modes that have different wavelengths, with the lowest-order transverse mode $LP_{01}$ having a wavelength $\lambda_{01}$, which in an example is 850 nm, while the other higher-order modes ($LP_{11}$, $LP_{21}$, $LP_{02}$, etc.) have shorter wavelengths, as illustrated in the example VCSEL spectrum of FIG. 2 taken from the '888 patent, wherein $\Delta\lambda_{max}=1.5$ nm. In another example, light source 24 is a Silicon-photonics laser that generates an output 26 at a single wavelength, $\lambda O$. In another example, light source 24 is an array of a Silicon-photonics laser operating at different wavelengths, $<\lambda O1$, $<\lambda O2$, $<\lambda O3$, and $<\lambda O4$, and multiplexed together into a single output 26. The optical transmitter 20 is configured to drive light source 24 so that light 26 carries information. As a VCSEL is used herein as the exemplary light source 24, the VCSEL is also referred to herein as VCSEL 24.

The first multimode optical fiber 40 have first and second ends 42 and 44 that define a length L1, with the first end being optically coupled to light source 24. The first multimode optical fiber 40 is a standard type of multimode optical fiber having a peak wavelength of $\lambda_{P40}$ that can be, for example, 850 nm, which matches the wavelength $\lambda_{01}$ of the lowest-order mode of light source 24. The first multimode optical fiber 40 is "standard" in the sense that it has an alpha profile (i.e., a value for $\alpha$) that generally minimizes the intermodal dispersion at the peak wavelength of $\lambda_{P40}$.

In an example, first multimode optical fiber 40 carries greater than about 50 LP modes and has a peak wavelength $\lambda_{P40}$ of 850 nm, 980 nm or 1,060 nm, 1310 nm or 1550 nm. The first multimode optical fiber 40 is the primary optical fiber in system 10 and so is referred to hereinafter as "primary fiber 40." Likewise, second multimode optical fiber 60 is a compensating optical fiber designed to compensate for chromatic modal dispersion arising in primary fiber 40 and so is referred to hereinafter as "compensating fiber 60."

In practice, the order of the primary and compensating fibers can be switched so that the compensating fiber 60 is directly connected to transmitter 20 and the primary fiber 40 is directly connected to the receiver 80.

In an example embodiment, primary fiber 40 is optimized to transmit an optical signal over distances from about tens of meters to several hundred meters with low modal delay. The primary fiber 40 can be used in system 10 to distribute an optical signal throughout a building or a limited area, in accord with current practices for multimode optical fibers. The primary fiber 40 may also be intended for high data-rate transmission, such as transmission speeds of greater than 10 Gb/s, greater than 25 Gb/s or greater than 40 Gb/s.

Examples of primary fiber 40 include an OM3-type fiber that has a nominal bandwidth $BW_{40}=2.0$ GHz·km or better (higher) at 850 nm, and OM4-type fiber that has a nominal bandwidth $BW_{40}=4.7$ GHz·km or better at 850 nm. Other examples of primary fiber 40 include multimode fiber optimized for longer wavelengths than 850 nm. In one example, primary fiber 40 is optimized to have a bandwidth greater than 2.5 GHz-km at a wavelength situated in the 900-1250 nm window. In a preferred embodiments, primary fiber 40 exhibits an overfilled bandwidth at a wavelength situated in the 900-1100 nm which is greater than 4 GHz-km. In another example, primary fiber 40 is optimized to have a bandwidth greater than 2.5 GHz-km at a wavelength situated in the 1260-1610 nm window. In a preferred embodiment, primary fiber 40 exhibits an overfilled bandwidth at 1310 nm which is greater than 3.75 GHz-km. In another preferred embodiment, primary fiber 40 exhibits an overfilled bandwidth at 1550 nm which is greater than 3.75 GHz-km.

The compensating fiber 60 has first and second ends 62 and 64 that define a length L2, with the first end being optically coupled to second end 44 of primary fiber 40 at a coupling location 52. The particular configuration and properties of compensating fiber 60 are described in greater detail below. The second end 64 of compensating fiber 60 is optically coupled to receiver 80, which includes a detector 84 such as a photodetector.

Figure 3A:
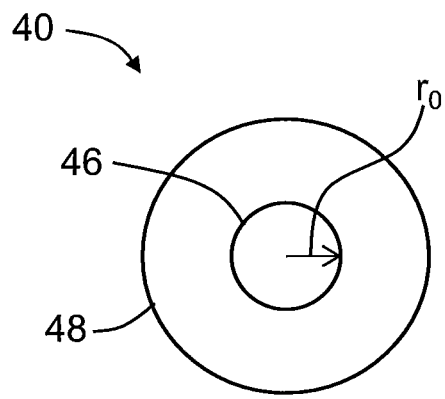
FIGS. 3A and 3B are example cross-sectional views of the primary and compensating multimode optical fibers of the system of FIG. 1.
Figure 3B:
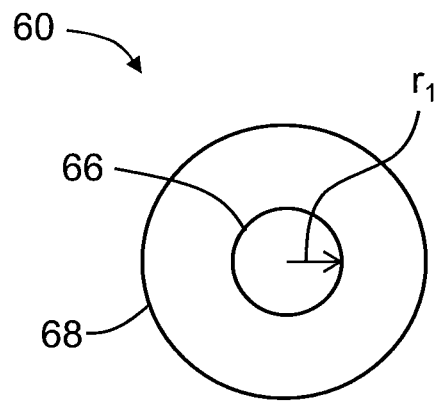

FIGS. 3A and 3B are respective cross-sectional views of primary and compensating fibers 40 and 60. The primary fiber 40 has a core 46 with a radius $r_0$ and a surrounding cladding 48. The compensating fiber 60 has a core 66 with a radius $r_1$ and a surrounding cladding 68. In an example, radius $r_0$ is equal to or substantially equal to radius $r_1$ for the purpose of optimizing the optical coupling between fibers 40 and 60 at coupling location 52. In an example, coupling location 52 is defined by a splice between the two optical fibers 40 and 60, or by an optical fiber connector. At least one of primary fiber 40 and compensating fiber 60 can have a low index trench in the cladding for the purpose of improving fiber-bending performance.

Figure 3C:
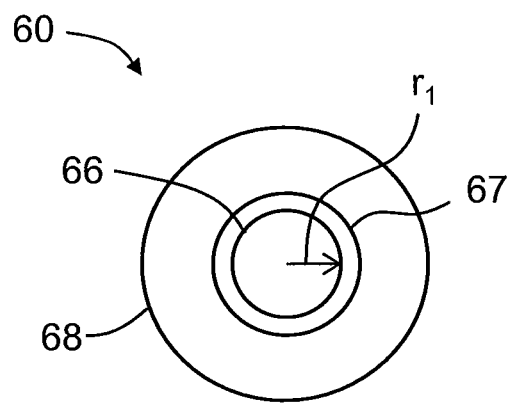
FIG. 3C is similar to FIG. 3B and illustrates an example embodiment of a bend-insensitive compensating fiber.

FIG. 3C is similar to FIG. 3B and illustrates an example embodiment of a bend-insensitive compensating fiber 60. In an example, the bend insensitive property of compensating fiber 60 is provided by the addition of a trench 67 (i.e., a low-index ring) adjacent core 66. The trench 67 need not be immediately adjacent core 66. Examples of such a bend-insensitive fiber are disclosed in U.S. Pat. No. 7,680,381. It will be understood that the term "bend-insensitive" and like terms actually mean "substantially bend insensitive."

Figure 4:
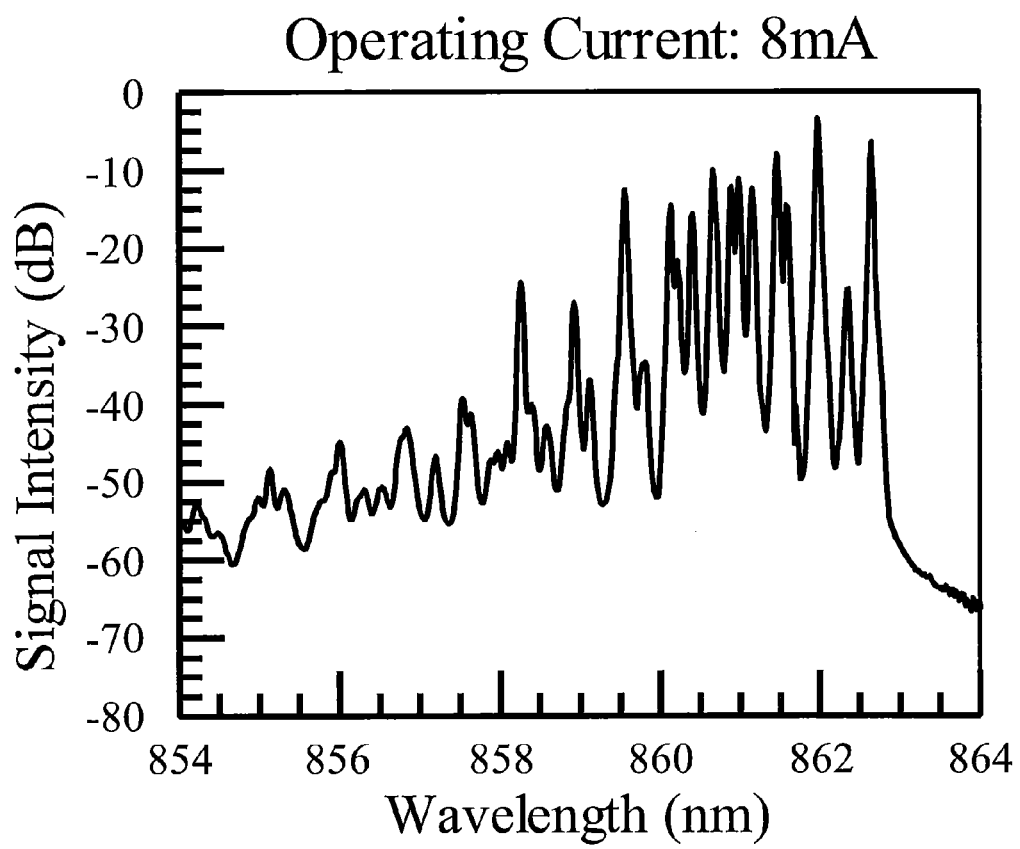
FIG. 4 is a plot of wavelength (nm) vs. signal intensity (dB) that represents the measured spectrum for a 40 Gb/s VCSEL operating at a current of 8 mA.

As it turns out, the spectra from different VCSELs can differ substantially. For typical 10 Gb/s VCSELs, the wavelength bandwidth $\Delta\lambda_{max}$ is about 1 nm. But for VCSELs used in parallel optics and for higher data rates of 25 Gb/s and 40 Gb/s, the wavelength bandwidth $\Delta\lambda_{max}$ can be 2 nm to 3 nm or even greater. FIG. 4 is a plot of wavelength (nm) vs. signal intensity (dB) that represents the measured spectrum for a 40 Gb/s VCSEL operating at a current of 8 mA. The spectrum of FIG. 4 shows the discrete transverse modes and also indicates that the bandwidth $\Delta\lambda_{max}$ of the VCSEL spectrum exceeds 4 nm.

In addition, the VCSELs available on the market and that are compliant with the relevant standard can have output wavelengths that range from 840 nm to 860 nm. This means that a given VCSEL light source 24 can operate relatively far off of the peak wavelength $\lambda_P$ for a standard multimode optical fiber such as primary fiber 40. It is therefore difficult and impractical to produce many different multimode fibers that are optimized for all the possible wavelength spectra for a given type of VCSEL light source 24.

As discussed above and illustrated in FIGS. 2 and 4, VCSELs have discrete transverse modes having different wavelengths. The modes are generally denoted as $LP_{xx}$, in a similar way to the multiple modes supported by multimode fibers. The $LP_{01}$ mode is the fundamental (lowest-order) and is located at the center of the VCSEL axis, while the higher-order modes are located increasingly farther away from the VCSEL axis and have increasingly shorter wavelengths.

The RMS spectral width can be used to characterize the VCSEL linewidth. For a 10 Gb/s Ethernet transmission by a VCSEL, the RMS linewidth of the VCSEL is less than or equal to about 0.45 nm. For 40 Gb/s and 100 Gb/s parallel optics transmission, the RMS linewidth of the VCSEL is generally less than or equal to about 0.65 nm.

Thus, when VCSEL light source 24 is optically coupled to primary fiber 40, the lower-order mode with the largest wavelength travels over an optical path that runs down the center of the fiber, while the higher-order modes that have smaller wavelengths travel over optical paths that are farther away from the center of the fiber. The spatial wavelength dependence of light 26 coupled into primary fiber 40, as judged by the optical spectrum as a function of the radial position, depends on the particular VCSEL spectral characteristics and the optics used to couple the light from the VCSEL into the primary fiber. The radial wavelength property of the VCSEL light 26 launched into primary fiber 40 can be measured.

Figure 5:
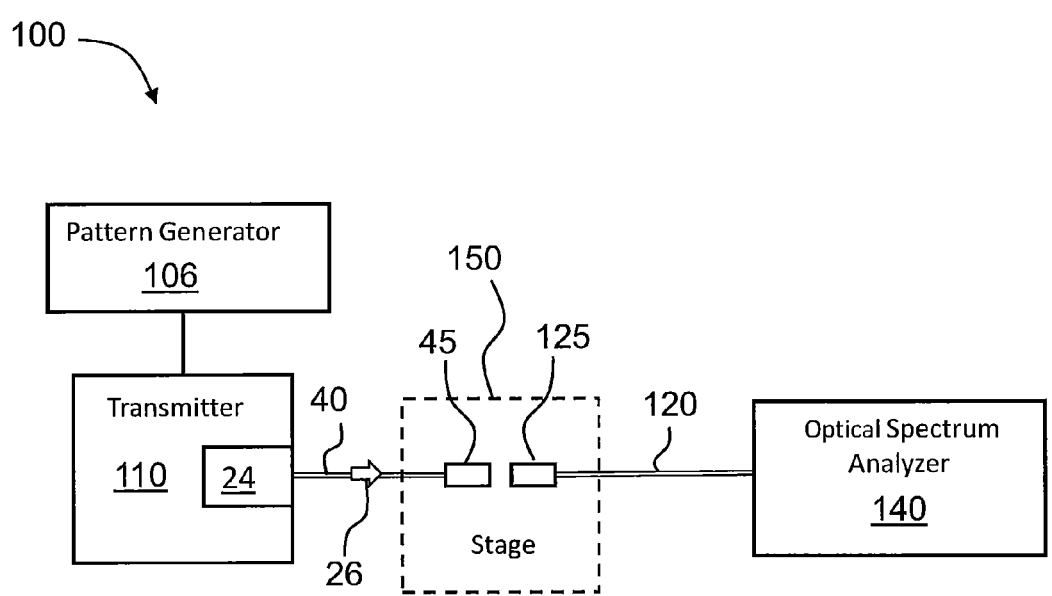
FIG. 5 is a schematic diagram of an example measurement system for measuring the spectral characteristics of a VCSEL light source using a fiber-offset method to calculate a center-wavelength difference $\Delta\lambda_{max-c}$.

FIG. 5 is a schematic diagram of an example measurement system 100 used to measure the radial wavelength dependence of VCSEL 24. The measurement system 100 includes a pattern generator 106 is used to electrically drive VCSEL 24 as packaged in an SFP+ or XFP form-factor transmitter 110. A multimode fiber—say, fiber 40—is directly connected at one end to VCSEL 24 and has a connector 45 at its opposite end. A single mode fiber 120 is also provided that has a connector 125 at one end and has its opposite end optically connected to an optical spectrum analyzer 140. The connectors 45 and 125 are operably supported in a precision alignment stage 150 that is used to optically couple fibers 40 and 120 and to provide select radial offsets between the two fibers ("fiber offsets").

The light 26 from VCSEL 24 is transmitted through fibers 40 and 120 for each fiber offset, as set by precision alignment stage 150. This transmitted light 26 is received by optical spectrum analyzer 140, which provides an optical spectrum for each fiber offset. Thus, offset single-mode fiber 120 is used to detect light 26 traveling in different radial positions in primary fiber 40.

Figure 6:
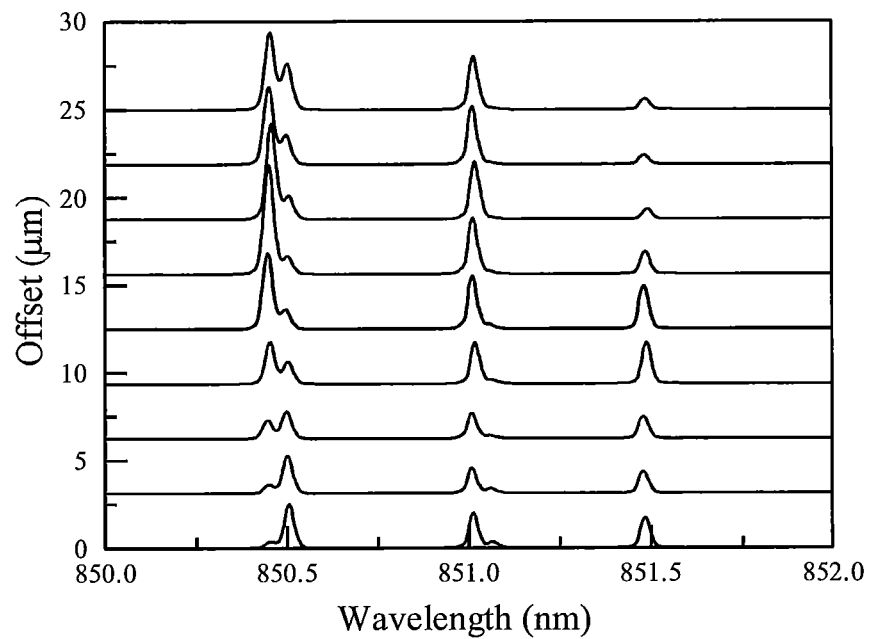
FIG. 6 is a plot of wavelength (nm) vs. fiber offset (μm) and shows the normalized wavelength spectra associated with a number of different fiber offsets as measured using the measurement system of FIG. 5.

FIG. 6 is a plot of wavelength (nm) vs. fiber offset (μm) and shows the normalized wavelength spectra associated with a number of different fiber offsets. A commercially available transmitter 110 was used to generate light 26. The height of each trace is normalized to 2.5 for the maximum height of the spectrum obtained with zero fiber offset. The offset for all other traces (spectra) was added in increments of 3.125 microns. The traces in FIG. 6 show that at each fiber offset there are several spectral peaks associated with the different VCSEL modes. However, the strength of each VCSEL mode varies with the fiber offset.

The center operating wavelength $\lambda_{CW}$ for each fiber offset can be calculated by one of the following equations.

$$\lambda_{CW} = \int S(\lambda) \cdot \lambda \cdot d\lambda / \int S(\lambda) \cdot d\lambda$$

$$\lambda_{CW} = \sqrt{\int S(\lambda) \cdot \lambda^2 \cdot d\lambda / \int S(\lambda) \cdot d\lambda}$$

These two equations produce essentially the same center results of center wavelength $\lambda_{CW}$ to within 0.002 nm or less. For the traces in FIG. 6, the center wavelength $\lambda_{CW}$ at each offset is calculated and plotted in FIG. 7. The plot of FIG. 7 indicates that the center wavelength $\lambda_{CW}$ drops as a function of greater fiber offset, with a maximum difference of 0.25 nm. For different VCSELs, the plot of FIG. 7 will vary in detail, but the general trend of center wavelength $\lambda_{CW}$ getting smaller as the fiber offset increases will be present.

Figure 7:
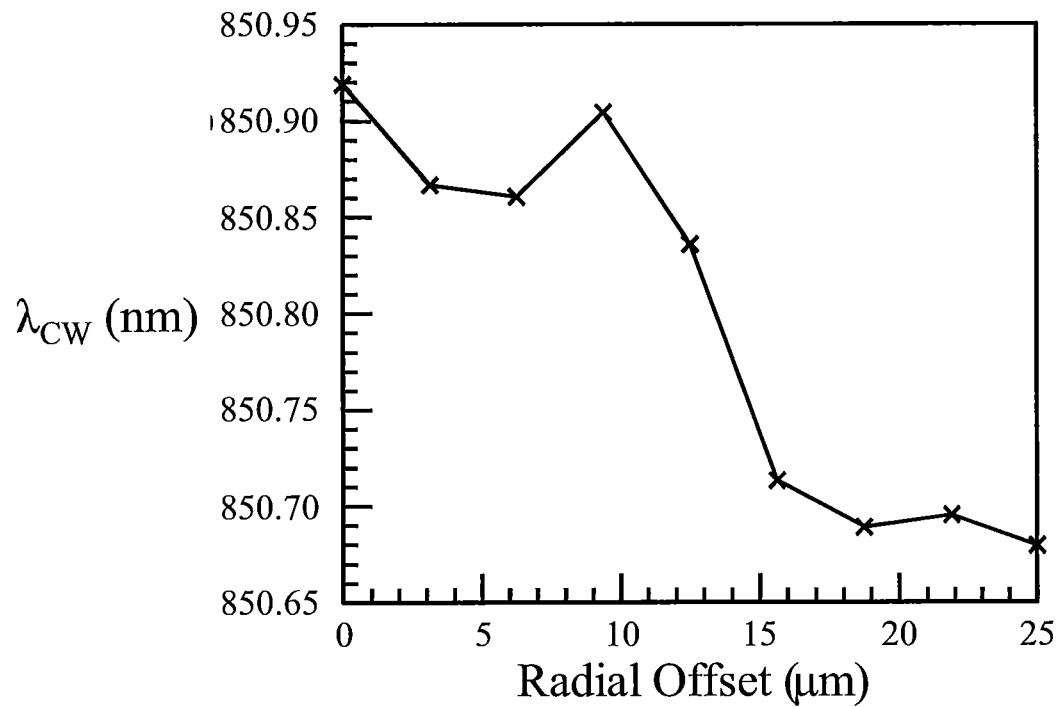
FIG. 7 is a plot of radial offset position (μm) vs. center wavelength (nm) for the data of FIG. 6, which provides a measure of the center-wavelength difference $\Delta\lambda_{max-c}$.

The plot of FIG. 7 shows a center-wavelength difference of:

$$\Delta\lambda_{max-c} \approx (850.92 - 850.67) \approx 0.25 \text{ nm}.$$

The value of $\Delta\lambda_{max-c}$ can be as high as about 1 nm (see, e.g., Pimpinella et al., "Investigation of bandwidth dependence on chromatic and modal dispersion in MMF links using VCSELs," *OFC/NFOEC Technical Digest* (January 2012), wherein $\Delta\lambda_{max-c} \approx 0.9$ nm).

Because the average/effective wavelength of VCSEL 24 varies with the radial position, the excited modes in fiber 40 carry different wavelengths. Due to the material chromatic dispersion, the modal delay of fiber 40 is optimized for one wavelength only. Therefore, the difference in the wavelengths of light 26 launched into the different modes, which are spatially located at different radial positions, causes an additional time-delay difference between the different modes when reaching end 44 of primary fiber 40.

Thus, while primary fiber 40 has optimized modal dispersion (i.e., minimum modal delay), there is now chromatic modal dispersion that is related to both the VCSEL wavelength distribution and the fiber material dispersion. Multimode fibers with a peak wavelength $\lambda_P = 850$ nm typically use $GeO_2$ to define the alpha profile of the fiber. However, this material has a relatively high chromatic dispersion, and therefore the chromatic modal dispersion will have a significant impact on a fiber optical transmission system that utilizes VCSEL 24 and multimode fiber 40.

As a first order approximation in estimating the time delay that derives from the chromatic modal dispersion in a multimode fiber, one can assume that the wavelength scales linearly with the radial position. This assumption yields four key parameters that can be used to estimate the time delay owing to chromatic dispersion:

1) the chromatic dispersion value D of the multimode fiber at the peak wavelength;
2) the value of $\Delta\lambda_{max-c}$, i.e., the maximum center-wavelength difference of light source 24 as measured, for example, via the center wavelength $\lambda_{CW}$ as a function of radial offset using measurement system 100;
3) the difference in the alpha parameter between the fiber's actual value $\alpha_a$
   and the optimum value $\alpha_{opt}$, i.e., $\Delta\alpha = \alpha_a - \alpha_{opt}$, which in the discussion below is also defined, between the primary and compensating fibers, as $\Delta\alpha = \alpha_{60} - \alpha_{40}$; and
4) the difference in the optimum operating wavelength $\lambda_P$ and the wavelength
   $\lambda$ emitted by VCSEL 24.

The maximum time-delay difference Δt due to chromatic modal dispersion that arises in primary fiber 40 can be estimated by the following equation, where D is the amount of chromatic dispersion (typically between −80 and −120 ps/(nm·km) at a wavelength of about 850 nm, with −100 ps/(nm·km) being representative of most multimode fibers, and L1 is the length of the primary fiber:

$$\Delta t = \Delta\lambda_{max-c} \cdot D \cdot L1 \tag{1}$$

To at least partially compensate for the time delay caused by chromatic modal dispersion in fiber 40, compensating fiber 60 is configured to provide an opposite modal delay, i.e., an opposite time delay for the various guided modes. In other words, the maximum compensating modal delay of compensating fiber 60 has the opposite sign to that of the chromatic modal dispersion of primary fiber 40, and has a magnitude sufficient to at least partially (and in an example, completely) cancel the delay due to chromatic modal dispersion. This is used to reduce or eliminate the overall time delay in the concatenated primary and secondary fibers 40 and 60 of system 10.

To achieve this compensating effect, compensating fiber 60 is provided with a modal delay by detuning its alpha value. In particular, the alpha value of compensating fiber 60 is detuned from its otherwise optimum value at the peak wavelength $\lambda_{P40}$ for primary fiber 40, i.e., $\alpha_{40} > \alpha_{60}$, so that the compensating fiber has a relatively high modal delay.

Figure 8:
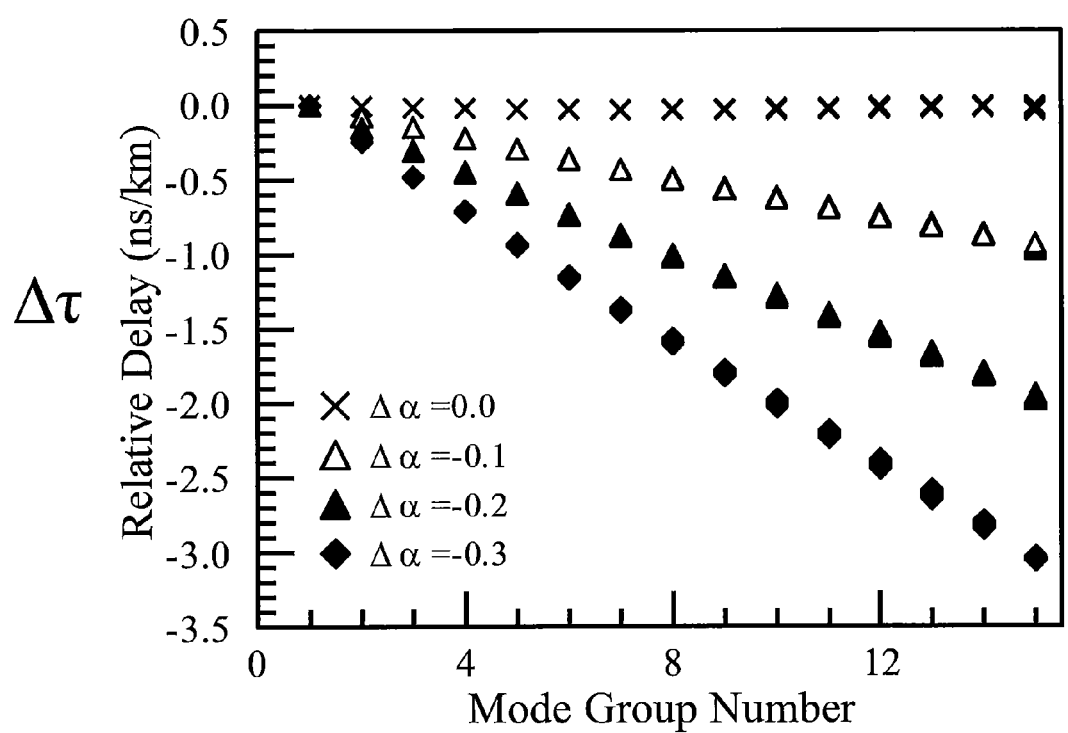
FIG. 8 is a plot of mode group number vs. relative delay $\Delta\tau$ (ns/km) for an example optical fiber having four different values of alpha detuning values $\Delta\alpha$, namely $\Delta\alpha=0$, $\Delta\alpha=-0.1$, $\Delta\alpha=-0.2$ and $\Delta\alpha=-0.3$.

FIG. 8 is a plot of mode group number vs. relative delay Δτ (ns/km) for an example fiber having four different alpha detuning values Δα, namely, Δα=0, Δα=0.1, Δα=0.2 and Δα=0.3. One example of compensating fiber 60 has a maximum relative refractive index $\Delta_0$=1%, and the core radius $r_1$=$r_0$=25 μm, so that the NA and core size match those of a standard 50 μm, multimode primary fiber 40.

It can be found that the maximum relative delay $\Delta\tau_{max}$ is related to the Δα (relative to the optimum α at 850 nm) by a simple equation, namely:

$$\Delta\tau_{max} = 10 \cdot \Delta_0 \cdot \Delta\alpha (\text{ns/km}) \quad (2A)$$

When Δ=1%, this reduces to:

$$\Delta\tau_{max} = 10 \cdot \Delta\alpha (\text{ns/km}) \quad (2B)$$

When Δ=0.5%, equation 2A reduces to:

$$\Delta\tau_{max} = 5 \cdot \Delta\alpha (\text{ns/km}) \quad (2C)$$

In system 10, the modal delay imparted to compensating fiber 60 by its detuned alpha parameter $\alpha_{60}$ compensates at least in part for the modal delays generated in primary fiber 40 from chromatic modal dispersion due to using VCSEL 24 having a polychromatic wavelength spectrum. Consequently, compensating fiber 60 has a relatively small bandwidth as compared to primary fiber 40 having a peak wavelength $\lambda_{P40}$, and in fact would not be suitable for use as a transmission (primary) optical fiber in system 10. An example bandwidth $BW_{60}$ for compensating fiber 60 is $BW_{60}$<500 MHz·km, while in another example $BW_{60}$<300 MHz·km, and in another example $BW_{60}$<100 MHz·km.

Another way of appreciating how much smaller the bandwidth $BW_{60}$ for compensating fiber 60 is as compared to the bandwidth $BW_{40}$ of primary fiber 40 is to consider the ratio $R_{BW}$ of these bandwidths at $\lambda_{40}$. In example embodiments, the ratio $R_{BW}=BW_{40}/BW_{60}$ is $R_{BW}$>3 or $R_{BW}$>5, or $R_{BW}$>10.

However, a benefit of compensating fiber 60 having such a small bandwidth is that only a relatively small length L2 of the compensating fiber is needed to provide the requisite chromatic modal dispersion for the entire system 10. The delays at each radial position in fiber 40 and in compensating fiber 60 are additive so that with the use of the compensating fiber, the overall delay for system 10 can be controlled as a function of radial position.

Also in an example embodiment, compensating fiber 60 is designed to have a peak wavelength $\lambda_{P60}$ that differs from the peak wavelength $\lambda_{P40}$ of primary fiber 40. This is analogous to detuning the alpha parameter in compensating fiber 60. In an example embodiment, $\lambda_{P60}-\lambda_{P40} \geq 400$ nm.

In an example, the length L2 of compensating fiber 60 is selected to optimize the overall performance of system 10, in particular the bandwidth performance of the system. This is somewhat counterintuitive given the fact that compensating fiber 60 has such a small bandwidth relative to primary fiber 40. The optimization of the bandwidth of system 10 is accomplished by providing compensating fiber 60 with the appropriate amount of alpha detuning (and thus mode delay) for the spectral characteristics of light source 24 and the particular primary fiber 40 used in system 10.

The length L2 of fiber 60 (in meters) suitable for use in system 10 can be calculated using the following formulas based on the maximum time delay difference Δt due to chromatic dispersion and the maximum relative delay $\Delta\tau_{max}$ per unit length for compensating fiber 60:

$$L2 = |\Delta t|/(|\Delta\tau_{max}|) \quad (3A)$$

$$L2 = |\Delta t|/(|10 \cdot \Delta_0 \cdot \Delta\alpha|) \quad (3B)$$

Equation 3B expressly shows that the greater the Δα, the smaller the length L2 of fiber 60 is required to compensate for the chromatic dispersion effect in primary fiber 40. To this end, in one embodiment, an example compensating fiber 60 has a value for Δα in the range −0.1≤Δα≤−0.9. In another embodiment, an example compensating fiber 60 has a value for Δα in the range, −0.1≥Δα≥−0.9. In another embodiment, an example compensating fiber 60 has a value for Δα in the range, 0.3≤|Δα|≤0.8. In another embodiment, an example compensating fiber 60 has a value for Δα in the range, −0.3≥Δα≥−0.7. In another embodiment, an example compensating fiber 60 has a value for Δα in the range, 0.3≤Δα≤0.8.

It is noted that some amount of chromatic modal dispersion exists also in compensating fiber 60. However, the chromatic modal dispersion is very small compared to the modal delay created by the alpha detuning and can thus be ignored for a short length L2 of compensating fiber 60. However, this effect can be taken into account if the length L2 of compensating fiber 60 needs to be relatively large. This situation is addressed in greater detail below.

In other embodiments, compensating fiber 60 can have a non-α profile to provide additional latitude in forming the relative refractive index profile for the purpose of obtaining a select differential mode delay to match the higher order modes of the VCSEL light source 24 to obtain improved chromatic dispersion compensation. In an example, the relative refractive index profile for compensating fiber 60 includes trench 67 (see FIG. 3C), which provides the compensating fiber with an enhanced insensitivity to bending.

In examples where Δα is large (e.g., Δα≤−0.2), the length L2 of compensating fiber 60 may be quite short, e.g., L2≤50 m or L2≤20 m, or L2≤15 m or L2≤10 m, or L2≤5 m. When compensating fiber 60 is used in system 10 to compensate for chromatic modal dispersion effects, the overall system or link bandwidth $BW_{10}$ of the system can be made greater than either the bandwidth $BW_{40}$ of fiber 40 or the bandwidth $BW_{60}$ of fiber 60 alone.

It is also noted that the detuned alpha parameter $\alpha_{60}$ of compensating fiber 60 provides more tolerance in making the compensating fiber because the fiber can accommodate a larger refractive index profile error as compared to the design target since the compensating fiber has a shorter length than primary fiber 40. For VCSELs 24 with different spatial wavelength dependence as characterized by different values of the center operating wavelength $\lambda_{CW}$ and different values of $\Delta\lambda_{max-c}$, one can achieve optimum system performance by choosing different lengths L2 of compensating fiber 60 and without having to manufacture another type of primary fiber 40. In example embodiments, the length ratio L1/L2 of primary fiber 40 as compared to compensating fiber 60 is 2:1 or 3:1 or 5:1 or 10:1 or 20:1 or even 50:1. In an example embodiment, L1/L2 is in the range from 2≤L1/L2≤50.

The length L2 of compensating fiber 60 can be adjusted to at least partially compensate for varying amounts of chromatic modal dispersion effects that arise in primary fiber 40 due to the different lengths L1 of the primary fiber and the different spectral characteristics of light source 24. To this end, in an example embodiment, a number of compensating fibers 60 having the same general optical properties (i.e., Δα, $\Delta\lambda_P$, core radius, etc.) can be produced in different lengths L2, such as 2 m, 5 m, 10 m, 50 m, 100 m, etc., and then used alone or in combination with each other via concatenation to provide the overall length L2 necessary to achieve a desired degree of chromatic dispersion compensation in system 10.

Example Compensating Fibers

Table 1 below illustrates the calculation of the length L2 of compensating fibers 60 for use in several configurations for system 10, where fibers 40 and 60 each have a relative refractive index $\Delta=1\%$ and a core diameter of 50 µm. The example compensating fibers 60 in Table 1 are optimized for operation with an example light source 24 generating light at a wavelength $\lambda_{01}=850$ nm, and in Examples 6 and 7 are optimized for operation with an example light source 24 generating light at peak wavelengths of $\lambda_{01}=980$ nm and 1060 nm, respectively.

Equation 1 above was used to calculate the time delay $\Delta t$ per kilometer of primary fiber 40 based on values for $\Delta\lambda_{max-c}$, D and L1. Then, the relative modal delay $\Delta\tau$ of fiber 60 was calculated using equation (2B), which assumes $\Delta 0=1\%$, where $\alpha_{60}<\alpha_{40}$. After the relative modal delay $\Delta\tau$ and the time delay $\Delta t$ per kilometer of primary fiber 40 was calculated, equation (3A) was used to calculate the length L2 of fiber 60 needed to produce a modal delay of the same magnitude but opposite sign as the chromatic modal dispersion associated with primary fiber 40.

In Table 1, "EX" stands for "example," D stands for the amount of chromatic dispersion at the peak wavelength $\lambda_P=850$ nm and is measured in units of ps/nm·km, the parameter $\lambda_{01}$ is the main wavelength of VCSEL light source 24 measured in nanometers for the fundamental transverse mode $LP_{01}$ and generally represents the peak wavelength $\lambda_{P40}$ for primary fiber 40, $\Delta\lambda_{max-c}$, is the center-wavelength difference measured in nanometers, and $\Delta t$ is the maximum time delay needed in units of nanoseconds to compensate fiber 60 for the chromatic modal dispersion along the fiber.

TABLE 1

Examples for $\Delta = 1\%$

| EX | D | $\lambda_{01}$ | $\Delta\lambda_{max-c}$ | L1 (m) | $\Delta\alpha$ | $\Delta t$ (ns) | L2 (m) |
|---|---|---|---|---|---|---|---|
| 1 | −100 | 850 | 1 | 100 | −0.2 | 0.01 | 5 |
| 2 | −100 | 850 | 0.8 | 300 | −0.2 | 0.024 | 12 |
| 3 | −100 | 850 | 0.7 | 300 | −0.4 | 0.021 | 5.25 |
| 4 | −100 | 850 | 1 | 600 | −0.3 | 0.06 | 20 |
| 5 | −100 | 850 | 0.8 | 300 | −0.2 | 0.024 | 11.8 |
| 6 | −56 | 980 | 1 | 300 | −0.3 | 0.0168 | 6.3 |
| 7 | −34 | 1060 | 1 | 300 | −0.3 | 0.0102 | 4.1 |

The data of Table 1 indicate that the length L2 of compensating fiber 60 is substantially insensitive to a slight variation in the VCSEL central (main) wavelength $\lambda_{01}$, leaving the choice of the length L2 to be primarily determined by the length L1 of primary fiber 40 and the VCSEL radial wavelength dependence as described by $\Delta\lambda_{max-c}$. We note here that in order to generate the necessary modal delay in just a single multimode fiber while also compensating for spatial chromatic dispersion, the $\Delta\alpha$ is 0.01, which is far less than the $\Delta\alpha$ for compensating fiber 60.

In the calculation in Table 1, the chromatic modal dispersion of compensating fiber 60 was ignored because it was considered far smaller than that of primary fiber 40 and, accordingly, its relative effect was deemed negligible. To obtain more accurate results, one can use the following equation:

$$L2 = \frac{(L1 + L2) \cdot D \cdot \Delta\lambda_{max-c}}{|\Delta\tau_{max}|} \quad (4A)$$

wherein solving for L2 yields the relationship:

$$L2 = \frac{L1 \cdot D \cdot \Delta\lambda_{max-c}}{|\Delta\tau_{max}| - D \cdot \Delta\lambda_{max-c}}. \quad (4B)$$

Table 2 below illustrates several additional examples similar to those shown in Table 1, but wherein primary fiber 40 and compensating fiber 60 each have a relative refractive index $\Delta=0.5\%$ and a core diameter of 50 µm. In Examples 8 and 9, primary fiber 40 is optimized for operation with a light source 24 generating light at a peak wavelength $\lambda_{P40}=\lambda_{01}=850$ nm. In Example 10, primary fiber 40 is optimized for operation with a light source 24 generating light at a peak wavelength $\lambda_{P40}=\lambda_{01}=980$ nm. In Example 11, primary fiber 40 is optimized for operation with a light source 24 generating light at a peak wavelength $\lambda_{P40}=\lambda_{01}=1{,}060$ nm. As in the calculation for Table 1, in Table 2, the chromatic modal dispersion of compensating fiber 60 was deemed negligible and was therefore ignored.

TABLE 2

Examples for $\Delta = 1\%$

| EX | D | $\lambda_{01}$ | $\Delta\lambda_{max-c}$ | L1 (m) | $\Delta\alpha$ | $\Delta t$ (ns) | L2 (m) |
|---|---|---|---|---|---|---|---|
| 8 | −100 | 850 | 1 | 100 | −0.2 | 0.01 | 10 |
| 9 | −100 | 850 | 1 | 600 | −0.3 | 0.06 | 40 |
| 10 | −56 | 980 | 1 | 300 | −0.3 | 0.0168 | 12.7 |
| 11 | −34 | 1060 | 1 | 300 | −0.3 | 0.0102 | 8.2 |

In addition to compensating for the chromatic dispersion effects caused by differences in the particular spectra of light sources 24, compensating fiber 60 may be used to compensate for modal dispersion in primary fiber 40 that arises in the case where $\lambda_{01}$ is substantially different from $\lambda_{P40}$. For example, if primary fiber 40 has a peak wavelength $\lambda_{P40}=850$ nm, then compensating fiber 60 can compensate for chromatic dispersion arising from using a light source 24 having a center operating wavelength $\lambda_{CW}$ of 980 nm or 1,060 nm, which will give rise to an additional modal delay from compensating fiber 60.

In the case where compensating fiber 60 is used to compensate for the modal dispersion from primary fiber 40 used at an operating wavelength that is substantially different from $\lambda_{P40}$, the length L2 for fiber 60 may not be negligible compared to the length L1 for fiber 40. This means that the chromatic modal dispersion in compensating fiber 60 may no longer be negligible and would need to be taken into account.

Thus, in calculating the length L2 of compensating fiber 60 necessary to compensate both for the modal dispersion of primary fiber 40 and for the chromatic modal dispersion arising in the compensating fiber 60, the following equation applies, wherein the amount of chromatic modal dispersion is MD:

$$L2 = \frac{MD + (L1 + L2) \cdot D \cdot \Delta\lambda_{max-c}}{|\Delta\tau_{max}|} \quad (4C)$$

wherein solving for L2 yields the relationship:

$$L2 = \frac{L1 \cdot D \cdot \Delta\lambda_{max-c} + MD}{|\Delta\tau_{max}| - D \cdot \Delta\lambda_{max-c}} \quad (4D)$$

Table 3 below illustrates examples where compensating fiber 60 is used to compensate for the chromatic modal dispersion of primary fiber 40 in the situation where $\lambda_{01}$ is substantially different from the peak wavelength $\lambda_{P40}$. Table 3 includes the maximum mode delay MD (ns) at the peak wavelength $\lambda_{P40}$.

TABLE 3

Examples for $\Delta = 1\%$ and for wavelengths other than $\lambda_{P40}$

| EX | D | $\lambda_{CW}$ | $\Delta\lambda_{max-c}$ | L1 (m) | $\Delta\alpha$ | MD | $\Delta t$ (ns) | L2 |
|---|---|---|---|---|---|---|---|---|
| 12 | −56 | 980 | 1 | 300 | −0.6 | 0.3 | 0.0168 | 53.3 |
| 13 | −34 | 1,060 | 1 | 300 | −0.6 | 0.5 | 0.0102 | 85.8 |

The system 10 described herein is well suited to transmitting data at high rates, such as rates faster than or equal to 25 GB per second or greater than 40 GB per second. In an example embodiment, system 10 can have multiple fibers 60 that operate in parallel, one or more fibers 40 being concatenated with each fiber 60. The fiber 60 may also comprise a portion of a ribbon cable or other group of cables including 4, 12, 24, etc. fibers 60 for parallel optics configurations.

In another set of examples EX 14 through EX 16 set forth in Table 4 below, compensating fiber 60 has a different maximum relative refractive index $\Delta_0$ from the primary fiber 40, which is usually 1%. Because of the use of compensating fiber 60, wherein $\alpha_{60} < \alpha_{40}$, fewer modes can propagate in the compensating fiber for a given maximum relative refractive index. To increase the number of modes supported by compensating fiber 60, one can increase the maximum relative refractive index $\Delta_0$.

All the fibers of examples EX 14 through EX 16 in Table 4 have $\Delta_0 = 1.5\%$. The compensating fiber 60 having a higher maximum relative refractive index $\Delta_0$ than it might otherwise have if used as a conventional multimode fiber enables the use of shorter lengths L2. In an example, compensating fiber 60 has a maximum relative refractive index $\Delta_0$ of about 1.5%, while in another example the compensating fiber has a maximum relative refractive index $\Delta_0$ that is in the range from about 0.5% to about 1% larger than that of primary fiber 40.

TABLE 4

Examples for compensating fibers with $\Delta_0 = 1.5\%$

| EX | D | $\lambda_{01}$ | $\Delta\lambda_{max-c}$ | L1 (m) | $\Delta\alpha$ | $\Delta t$ (ns) | L2 (m) |
|---|---|---|---|---|---|---|---|
| 14 | −100 | 850 | 1 | 500 | −0.2 | 0.05 | 16.7 |
| 15 | −100 | 850 | 0.5 | 500 | −0.2 | 0.025 | 8.3 |
| 16 | −100 | 850 | 0.3 | 300 | −0.3 | 0.009 | 2 |

In an example, compensating fiber 60 has length L2 that in respective examples has L2≤20 m, L2≤10 m and L2≤5 m. In an example, primary fiber 40 has a length L1≥100 m, or L1≥300 m, or even L1≥500 m. In an example embodiment, the combination of primary fiber 40 and one or more compensating fibers 60 concatenated thereto defines a bandwidth $BW_{10}$ for system 10, wherein in one example $BW_{10} > 5,000$ MHz·km and in another example $BW_{10} > 7,000$ MHz·km and in another example $BW_{10} > 10,000$ MHz·km.

In an example embodiment, compensating fiber 60 can be a bend insensitive fiber, as described above in connection with FIG. 3C. As discussed above, an example bend-insensitive compensating fiber 60 has trench 67 adjacent core 66. However, in this example embodiment, trench 67 also allows the highest modes of the higher-order modes to propagate over substantial distances, whereas before these highest modes were lossy and so did not substantially contribute to the mode delay.

Thus, in an example embodiment of bend-insensitive compensating fiber 60, the parameters defining trench 67 are selected to minimize the adverse effects of the propagation of the highest modes while also providing the desired bend insensitivity.

Figure 9:
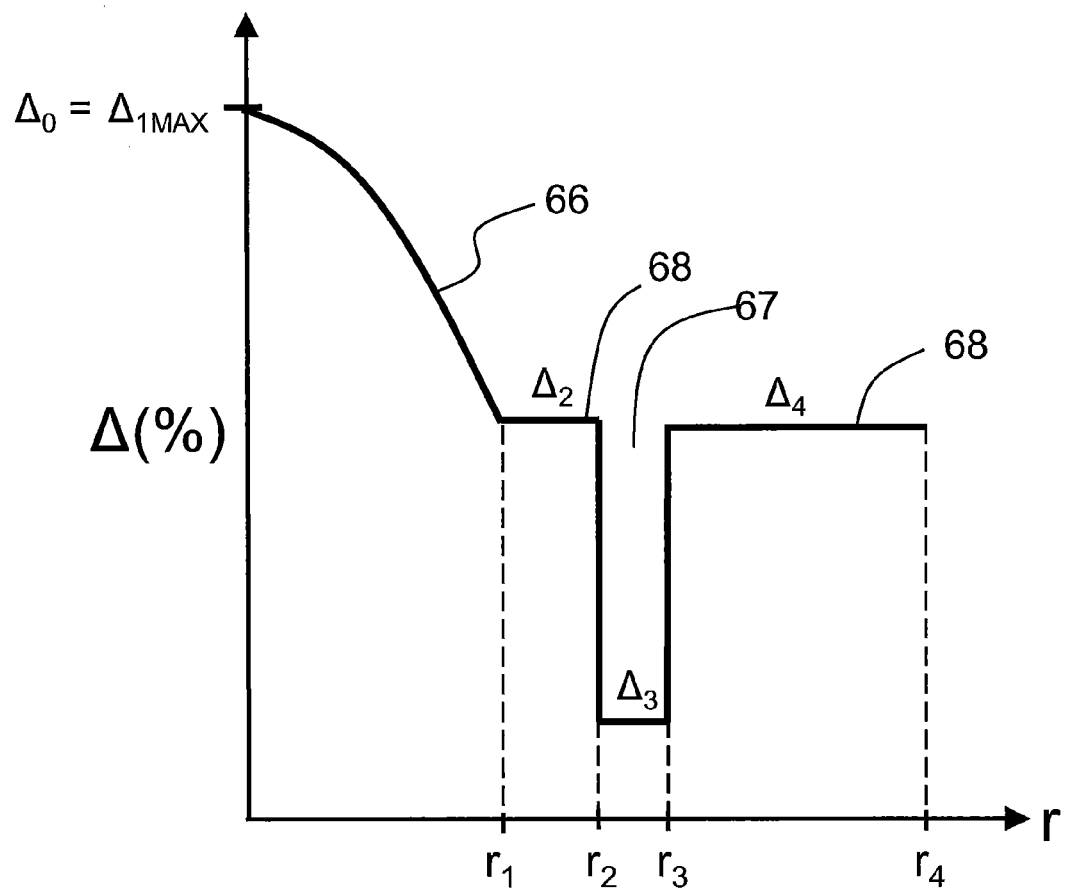
FIG. 9 is a plot of relative refractive index profile $\Delta(\%)$ vs. radius r for an example bend-insensitive compensating fiber.

Table 5 below sets forth example design parameters for an Example 17 of compensating fiber 60 wherein the compensating fiber is bend insensitive. FIG. 9 is a plot of the relative refractive index profile $\Delta$ (%) versus the radius of an example bend-insensitive compensating fiber 60 and shows the various design parameters (namely, relative refractive index values $\Delta_{1MAX}$, $\Delta_2$, $\Delta_3$, $\Delta_4$ and radii $r_1$ through $r_4$), examples of which are set forth in Table 5 below. The radii $r_1$ through $r_4$ are in microns and the relative refractive index values are in "$\Delta$ %." The trench 67 is shown by way of example as being spaced apart from core 66 by a distance $(r_2 - r_1)$ and thus can be considered as residing in cladding 68. Strictly speaking, in this geometry, cladding 68 comprises an inner and outer cladding corresponding to the relative refractive indices $\Delta_2$ and $\Delta_4$. Also, $\Delta_{1MAX} = \Delta_0$.

TABLE 5

Design parameters for Example 17 of compensating fiber 60

| Parameter | Example Value |
|---|---|
| $\Delta_{1MAX}$ | 1 |
| $r_1$ | 25 |
| $\alpha_{60}$ | 1.796 |
| $r_2$ | 26.72 |
| $\Delta_2$ | 0 |
| $r_3$ | 32.22 |
| $\Delta_{3MIN}$ | −0.5 |
| $r_4$ | 62.5 |
| $\Delta_4$ | 0 |

Figure 10:
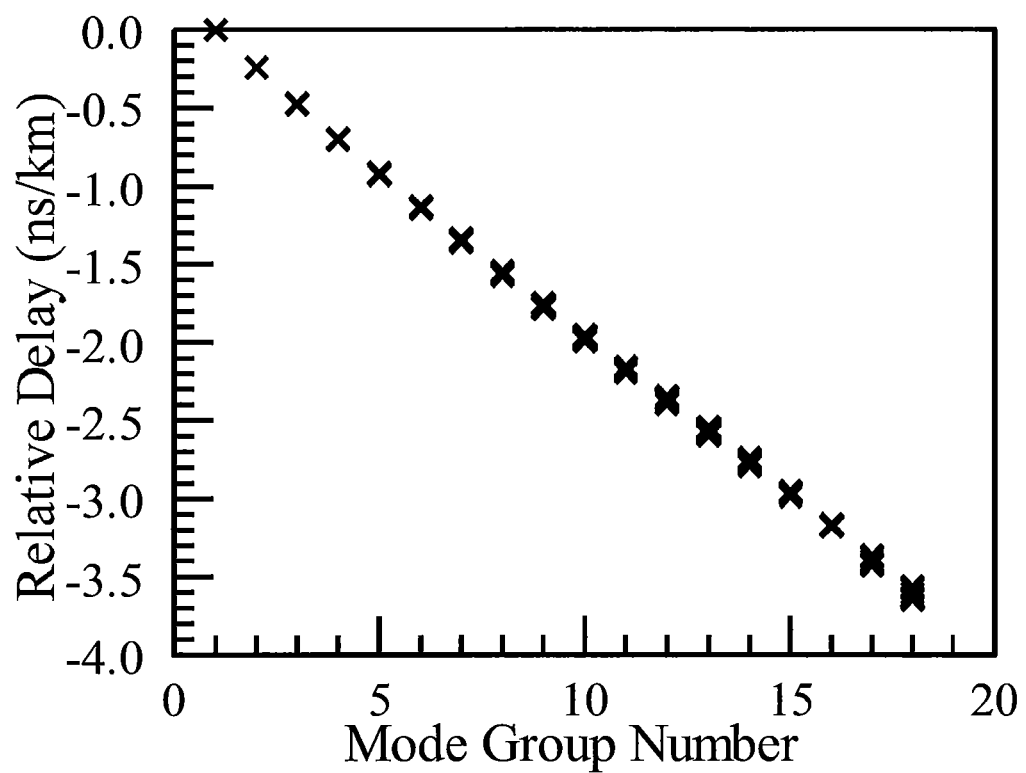
FIG. 10 is a plot of mode group number vs. relative delay (ns/km) for the compensating fiber set forth in Table 5 (below) for an operating wavelength of 850 nm.

FIG. 10 is a plot of the mode group number vs. the relative delay (ns/km) for compensating fiber 60 of Example 17 of Table 5 for an operating wavelength of 850 nm. FIG. 10 shows all mode groups for compensating fiber 60. Because the highest modes of the higher-order modes can propagate over the entire length of system 10, the maximum relative delay is slightly higher for a bend-insensitive compensating fiber 60 than for the more conventional form of the compensating fiber such as that shown in FIG. 3B.

However, the spread of the highest modes (i.e., the higher-order modes having the highest mode group numbers) is not substantial, and the relationship between the relative delay and the mode group number is smooth. This characteristic is also maintained at an operating wavelength of 1,060 nm so that the same bend-insensitive compensating fiber 60 can be used for a range of operating wavelengths, including at least those in the range from 850 nm to 1,060 nm.

Figure 11:
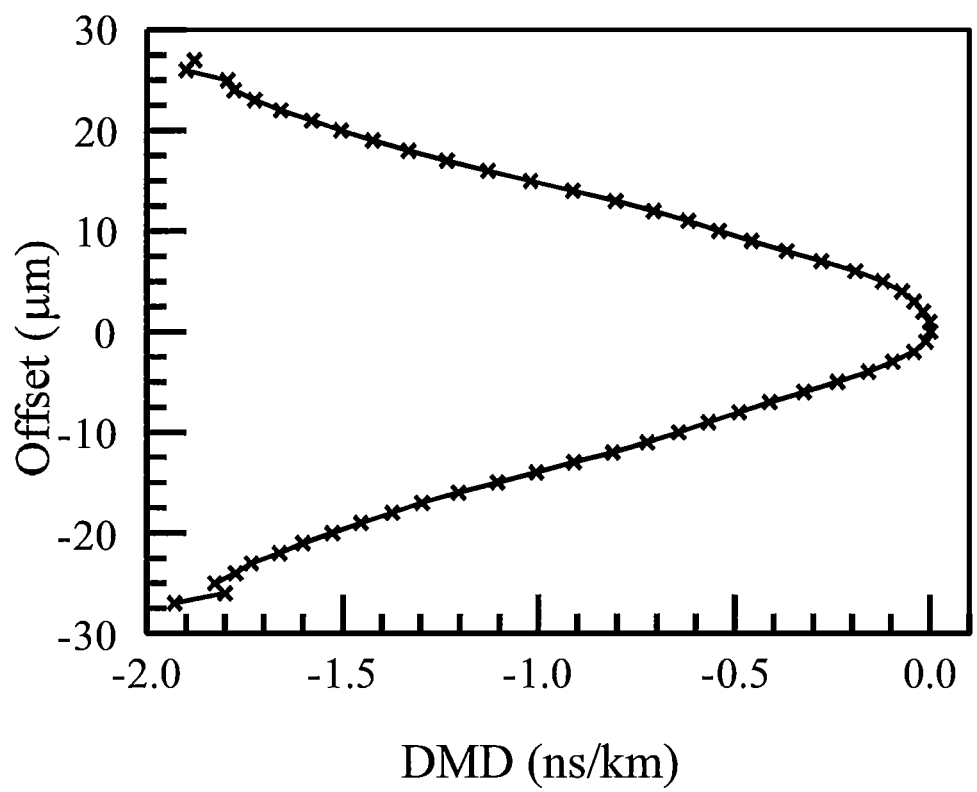
FIG. 11 is a plot of differential (relative) delay (DMD; ns/km) vs. radial launch offset (μm) for an example compensating fiber with $\alpha_{60} \approx 1.88$ for fiber scaled to 1,000 m in length.

FIG. 11 is a plot of differential modal delay (DMD), which is a measure of the average relative modal delay as measured in ns/km, vs. radial launch offset (μm) for an example compensating fiber 60 with $\alpha_{60} \approx 1.88$, with the fiber scaled to 1,000 m in length. The amount of DMD as shown in FIG. 10 corresponds to the prediction of the differential (relative) modal delay $\Delta\tau$ shown in FIG. 8.

Figure 12:
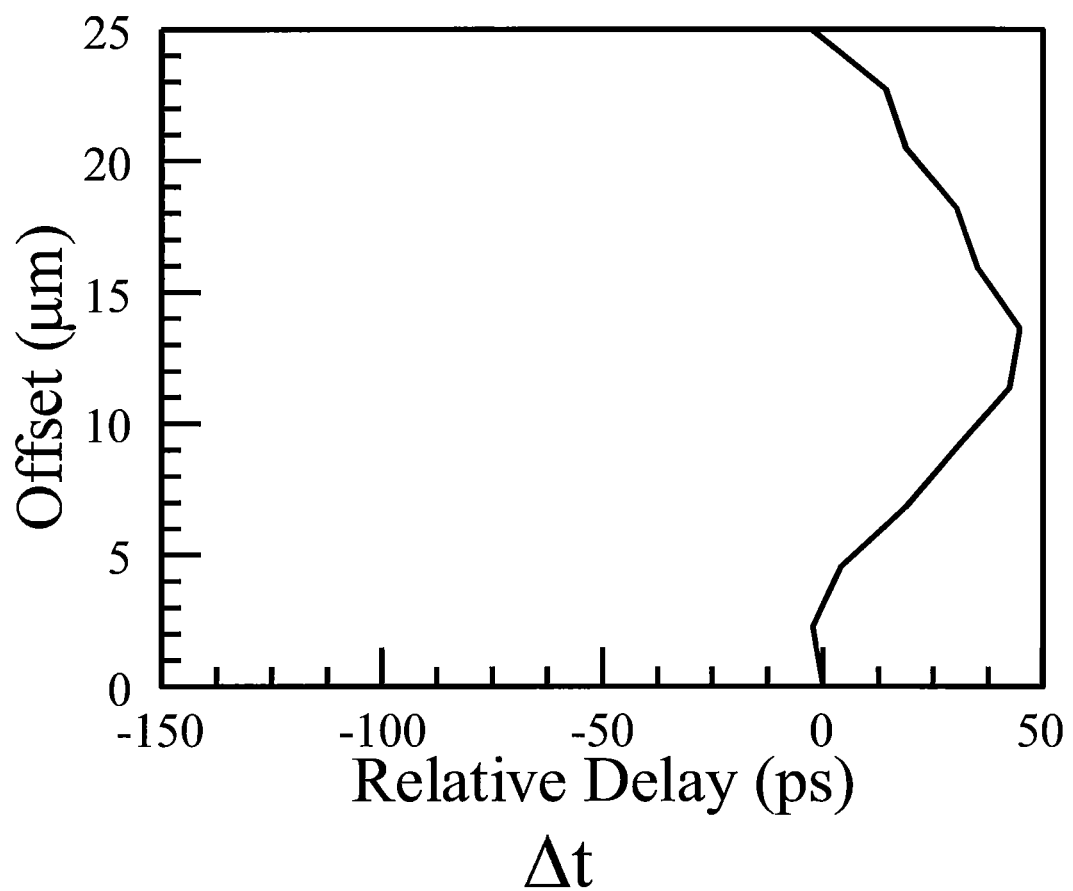
FIG. 12 is a plot of relative delay $\Delta t$ (ps) vs. radial launch offset (μm) for an example primary fiber with L1=1 km and an example compensating fiber with L2=70 m.

FIG. 12 is a plot of the relative delay $\Delta t$ (ps) vs. radial launch offset (μm) for an example primary fiber 40 that meets the OM4 standard as defined in TIA-492-AAAD concatenated with a 70 m compensating fiber 60, whose DMD properties are shown in FIG. 11, and that was concatenated with primary fiber 40 of length L1=1 km and of OM4 quality.

Figure 13:
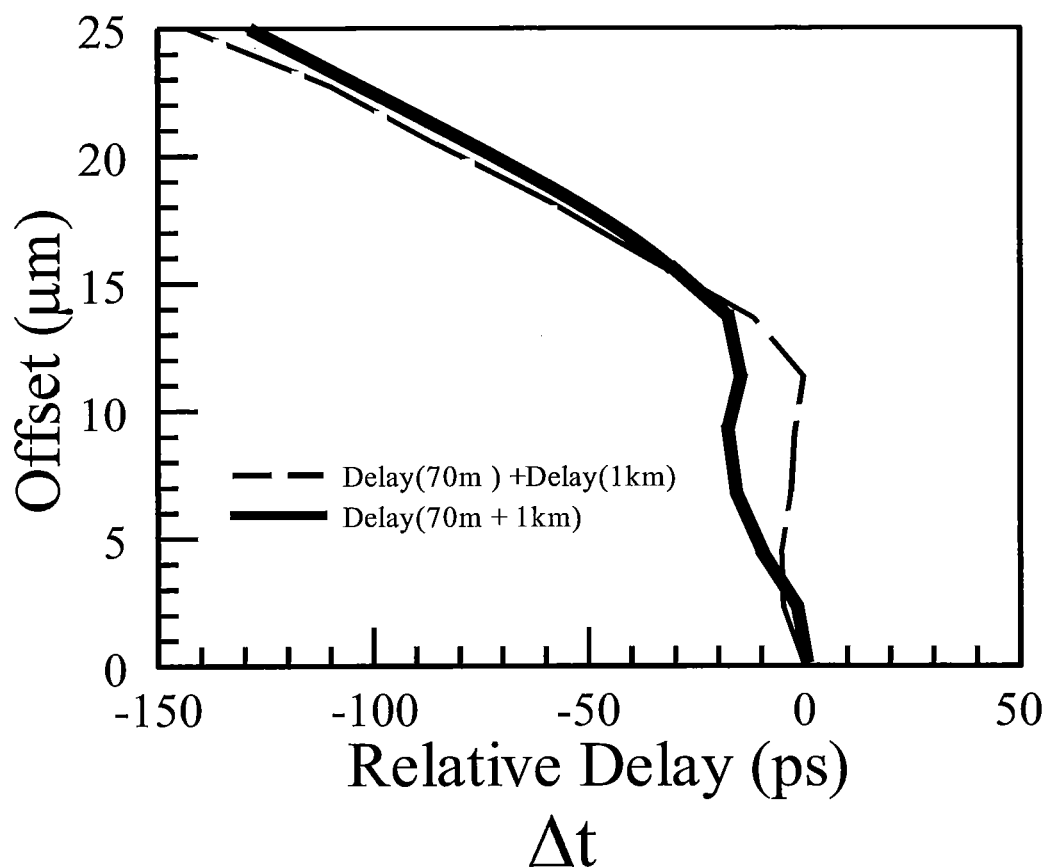
FIG. 13 is a plot similar to that of FIG. 12 for concatenated primary and compensating fibers.

FIG. 13 is a plot similar to FIG. 12 for concatenated primary and secondary fibers 40 and 60. The DMD curve of the combined primary and compensating fibers 40 and 60 is negative or tilted toward negative values when moving from the center (zero offset) to higher offset values (toward the edge of the core), which indicated that the modal delay of the link is altered by the introduction of the 70 m. The amount of tilting can be manipulated by setting the length of compensating fiber 60 to match the spatial chromatic dispersion from a specific VCSEL and primary fiber 40.

FIG. 13 shows two curves. One of the curves is a heavy solid line and represents the total delay provided by concatenated primary and secondary fibers 40 and 60 and is labeled as "Delay (70+1 km)." The other curve is a dashed line and represents the addition of the delay measured based on the delay of a 70 m compensating fiber 60 and the delay of a 1 km primary fiber 40 in two separate measurements and is labeled as ("Delay (70 m)+Delay (1 km)." The two curves follow each other closely with a relatively large region of substantial overlap. This characteristic means that the delays are substantially linearly accumulative and therefore approximately additive. This allows for concatenating two or more compensating fibers 60 (i.e., optically connecting two or more sections of the compensating fibers) to provide for the amount of delay needed for system 10.

The following examples illustrate the use of compensating fibers 60 for use in several configurations for system 10, where fibers 40 and 60 each have a relative refractive index Δ of approximately 1% and a core diameter of approximately 50 μm. The example primary fibers are optimized for operation with an example light source 24 generating light at a wavelength ΔO in the 1200-1400 nm wavelength range. In these examples, source 24 comprises four lasers transmitting data at a bit rate of 25 Gb/s at wavelengths of 1290, 1310, 1330 and 1350 nm.

In examples 18 and 19, modeled distribution of one thousand uncompensated primary fibers was modeled, where the primary fiber comprises a graded index core having a peak refractive index ranging from 0.85 to 1.15%, a core radius ranging from 24.3 to 25.4 microns, a core alpha ranging from 1.97 to 2.04. The primary fiber further comprises a trench spaced from the core by 1.1 to 1.7 microns, having a width of approximately 6 microns and having a relative refractive index ranging from −0.27 to −0.33%. The system reach is calculated by dividing the calculated overfilled bandwidth in Ghz-km by 25 Gb/s, resulting in values between 50 m and 450 m.

FIG. 14 illustrates a narrow range of alpha values between approximately 2.004 and 2.014 that provide a system reach of at least 300 m. It is desirable to increase the probability of producing multimode fibers capable of system reaches of at least 300 m for data rates of 25 Gb/s or greater, and this can be achieved by adding a short length of compensating fiber. For example, the compensating fiber could comprise a fiber optic jumper cable having a length of 0.5 m, 1 m, 2 m, 5 m, or any lengths therebetween.

FIG. 15 illustrates the calculated system reach when each of the modeled primary fibers 40 is combined in the ratio of 99:1 with a compensation fiber 60 having an alpha value of either 2.5 (example 18) or 1.62 (example 19). The use of a small length of the appropriate compensation fiber expands the range of alpha values that yield a system reach of at least 300 m. In example 18, combining a compensation fiber 60 with an alpha value of 2.5 with primary fibers having alpha values in the range of 2.00 to 2.01 enables a system reach of 300 m for all wavelengths in the 1290-1350 nm range and a source transmitting data at a rate of 25 Gb/s. IN example 19, combining a compensation fiber 60 with an alpha value of 1.62 with primary fibers having alpha values in the range of 2.01 to 2.02 enables a system reach of 300 m for all wavelengths in the 1290-1350 nm range and a source transmitting data at a rate of 25 Gb/s.

Example 18 illustrates a multimode optical fiber system comprising a primary multimode optical fiber having a length L1 and having a first relative refractive index profile with a first alpha α40 in the range of 1.97 to 2.04, configured to provide for a minimum amount of intermodal dispersion of guided modes at wavelengths in the 1200-1400 nm range; and a compensating multimode optical fiber having a length L2<L1 and that is optically coupled to the primary multimode optical fiber, wherein the compensating multimode optical fiber has a second relative refractive index profile with a second alpha value α60 in the range 2.3≤α60≤2.7, i.e. 0.3≤(α60−α40)≤0.8. The total length L1+L2 is preferably greater than about 100 m, more preferable greater than about 200 m and even more preferably greater than about 300 m. In some embodiments, L1/L2, the ratio of the lengths of primary fiber L1 and compensation fiber L2, is greater than 20, for example L1/L2>40, L1/L2>60, L1/L2>80, L1/L2>90, L1/L2>100. In some embodiments, 20<L1/L2<200, for example 40<L1/L2<200, 40<L1/L2<100 or 80<L1/L2<100.

Example 19 illustrates a multimode optical fiber system comprising a primary multimode optical fiber having a length L1 and having a first relative refractive index profile with a first alpha α40 in the range of 1.97 to 2.04, configured to provide for a minimum amount of intermodal dispersion of guided modes at wavelengths in the 1200-1400 nm range; and a compensating multimode optical fiber having a length L2<L1 and that is optically coupled to the primary multimode optical fiber, wherein the compensating multimode optical fiber has a second relative refractive index profile with a second alpha value α60 in the range 1.4≤α60≤1.8, i.e. −0.3≥(α60−α40)≥−0.8. The total length L1+L2 is preferably greater than about 100 m, more preferably greater than about 200 m and even more preferably greater than about 300 m. In some embodiments, L1/L2, the ratio of the lengths of primary fiber L1 and compensation fiber L2, is greater than 20, for example L1/L2>40, L1/L2>60, L1?L2>80, L1/L2.90, L1/L2.100. In some embodiments, 20<L1/L2<200, for example 40<L1/L2<200, 40<L1/L2<100 or 80<L1/L2<100.

The foregoing description provides exemplary embodiments to facilitate an understanding of the nature and character of the claims. It will be apparent to those skilled in the art that the various modifications to these embodiments can be made without departing from the spirit and scope of the appended claims.

What is claimed is:

1. A multimode optical fiber system for use with a VCSEL light source having transverse modes of different wavelength, comprising:

a primary multimode optical fiber having a length L1 and having a first relative refractive index profile with a first alpha value $\alpha_{40}$ generally configured to provide for a minimum amount of intermodal dispersion of guided modes at a peak wavelength $\lambda_{P40}$, wherein the different wavelengths of the transverse modes create chromatic modal dispersion; and a compensating multimode optical fiber having a length L2<L1 and that is optically coupled to the primary multimode optical fiber, wherein the compensating multimode optical fiber has a second relative refractive index profile with a second alpha value $\alpha_{60}$ selected to at least partially compensate for the chromatic modal dispersion, and wherein $-0.1 \geq (\alpha_{60} - \alpha_{40}) \geq -0.9$.

2. The multimode optical fiber system of claim 1, wherein the length L2 in meters is related to the length L1 in meters by the relationship:

$$L2 = |\Delta t|/(|\Delta \tau_{max}|)$$

where $\Delta t$ is a maximum time delay difference due to chromatic modal dispersion in the primary multimode optical fiber and $\Delta \tau_{max}$ is a maximum relative delay per unit length between guided modes traveling in the primary multimode optical fiber.

3. The multimode optical fiber system of claim 1, wherein $\Delta \tau_{max}$ is a maximum relative delay per unit length between guided modes traveling in the primary multimode optical fiber, D is an amount of chromatic dispersion in the primary multimode optical fiber and $\Delta \lambda_{max-c}$ is a center-wavelength difference for the VCSEL light source, and wherein the length L2 is related to the length L1 by the relationship:

$$L2 = \frac{L1 \cdot D \cdot \Delta \lambda_{max-c}}{|\Delta \tau_{max}| - D \cdot \Delta \lambda_{max-c}}.$$

4. The multimode optical fiber system of claim 1, wherein $\Delta \tau_{max}$ is a maximum relative delay per unit length between guided modes traveling in the primary multimode optical fiber, D is an amount of chromatic dispersion in the primary multimode optical fiber, $\Delta \lambda_{max-c}$ is a center-wavelength difference for the VCSEL light source, MD is an amount of chromatic modal dispersion in the compensating multimode optical fiber, and wherein the length L2 is related to the length L1 by the relationship:

$$L2 = \frac{L1 \cdot D \cdot \Delta \lambda_{max-c} + MD}{|\Delta \tau_{max}| - D \cdot \Delta \lambda_{max-c}}.$$

5. The multimode optical fiber system of claim 1, wherein the primary multimode optical fiber has a first bandwidth, the compensating multimode optical fiber has a second bandwidth that is less than the first bandwidth, and wherein the first and second bandwidths combine to form a system bandwidth that is greater than either the first or the second bandwidth.

6. The multimode optical fiber system of claim 5, wherein the second bandwidth is equal to or less than at least one of: 500 MHz·km, 300 MHz·km and 100 MHz·km.

7. The multimode optical fiber system of claim 1, wherein the primary multimode optical fiber has a first maximum relative refractive index and the compensating multimode optical fiber has a second maximum relative refractive index that is greater than the first maximum relative refractive index.

8. The multimode optical fiber system of claim 7, wherein the second maximum relative refractive index is about 1.5%.

9. The multimode optical fiber system of claim 7, wherein the difference between the first and second maximum relative refractive indexes is in the range from about 0.5% to about 1%.

10. The multimode optical fiber system of claim 1, wherein the compensating optical fiber is made up of concatenated sections.

11. The multimode optical fiber system of claim 1, wherein a ratio L1/L2 is in the range from $2 \leq L1/L2 \leq 20$.

12. The multimode optical fiber system of claim 1, wherein the compensating multimode optical fiber has a peak wavelength $\lambda_{60}$, and wherein $\lambda_{P60} - \lambda_{P40} \geq 400$ nm.

13. The multimode optical fiber system of claim 1, further comprising the VCSEL light source.

14. The multimode optical fiber system of claim 1, wherein the compensating fiber is configured to be bend insensitive.

15. A multimode optical fiber system having a bandwidth, comprising:
 a VCSEL light source that emits light in transverse modes having different wavelengths;
 a primary multimode optical fiber optically coupled to the VCSEL light source and having a length L1 and a first relative refractive index profile that includes a first alpha value $\alpha_{40}$ that gives rise to chromatic modal dispersion when the VCSEL light travels therethrough; and
 a compensating multimode optical fiber optically coupled to the primary multimode optical fiber and having a length L2<L1 selected to at least partially compensate for the chromatic modal dispersion by introducing an opposite modal delay defined by an alpha value $\alpha_{60}$ wherein $-0.1 \geq \Delta \alpha \geq -0.9$.

16. The system of claim 15, wherein the primary multimode optical fiber has a first bandwidth, the compensating multimode optical fiber has a second bandwidth that is less than the first bandwidth, and wherein the first and second bandwidths combine to define the system bandwidth, and wherein the system bandwidth is greater than either the first or the second bandwidth.

17. The multimode optical fiber system of claim 15, wherein the second bandwidth is equal to or less than at least one of: 500 MHz·km, 300 MHz·km and 100 MHz·km.

18. The system of claim 15, wherein a ratio L1/L2 is in the range from $2 \leq L1/L2 \leq 20$.

19. The system of claim 15, wherein the compensating multimode optical fiber has a maximum relative refractive index of $\Delta_0$ and wherein $1\% \leq \Delta_0 \leq 1.5\%$.

20. The system of claim 15, wherein the compensating multimode optical fiber is made up of two or more concatenated sections.

21. The system of claim 15, wherein the compensating multimode optical fiber is configured to be bend insensitive.

22. The system of claim 15, wherein the compensating multimode optical fiber has a relative refractive index profile having a core and a trench surrounding the core.

23. The system of claim 15, wherein $\Delta \tau_{max}$ is a maximum relative delay per unit length between guided modes traveling in the primary multimode optical fiber, D is an amount of chromatic dispersion in the primary multimode optical fiber, $\Delta \lambda_{max-c}$ is a center-wavelength difference for the VCSEL light source, and wherein the length L2 is related to the length L1 by the relationship:

$$L2 = \frac{L1 \cdot D \cdot \Delta \lambda_{max-c}}{|\Delta \tau_{max}| - D \cdot \Delta \lambda_{max-c}}.$$

24. The system of claim 15, wherein $\Delta \tau_{max}$ is a maximum relative delay per unit length between guided modes traveling in the primary multimode optical fiber, D is an amount of chromatic dispersion in the primary multimode optical fiber, $\Delta \lambda_{max-c}$ is a center-wavelength difference for the VCSEL light source, MD is an amount of chromatic modal dispersion in the compensating multimode optical fiber, and wherein the length L2 is related to the length L1 by the relationship:

$$L2 = \frac{L1 \cdot D \cdot \Delta\lambda_{max-c} + MD}{|\Delta\tau_{max}| - D \cdot \Delta\lambda_{max-c}}.$$

* * * * *